E. A. DIETERICH.
BRAKE MECHANISM.
APPLICATION FILED MAR. 24, 1915.

1,225,595.

Patented May 8, 1917.
5 SHEETS—SHEET 1.

WITNESSES
H. J. Walker

INVENTOR
Edward A. Dieterich
BY
ATTORNEYS

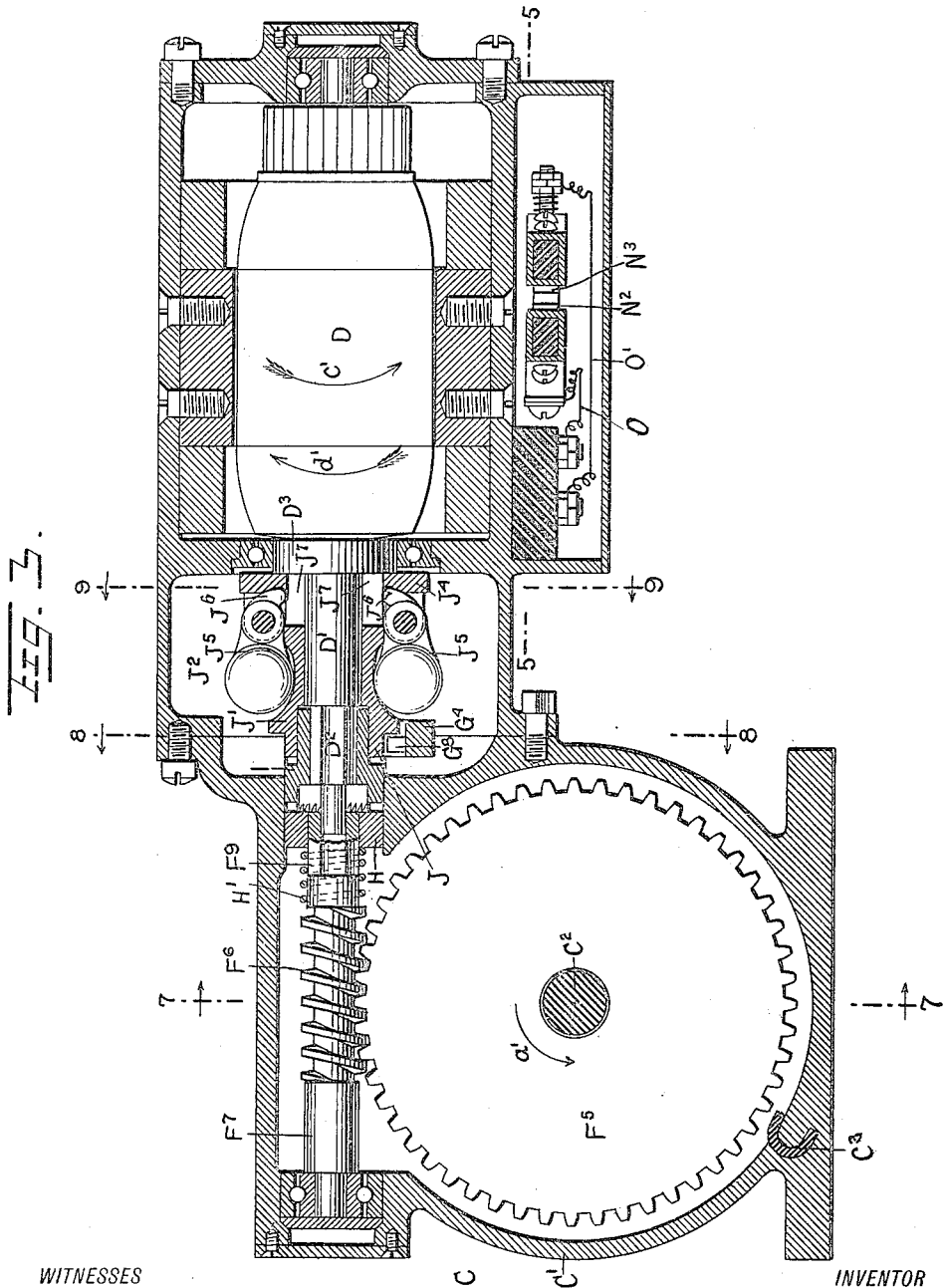

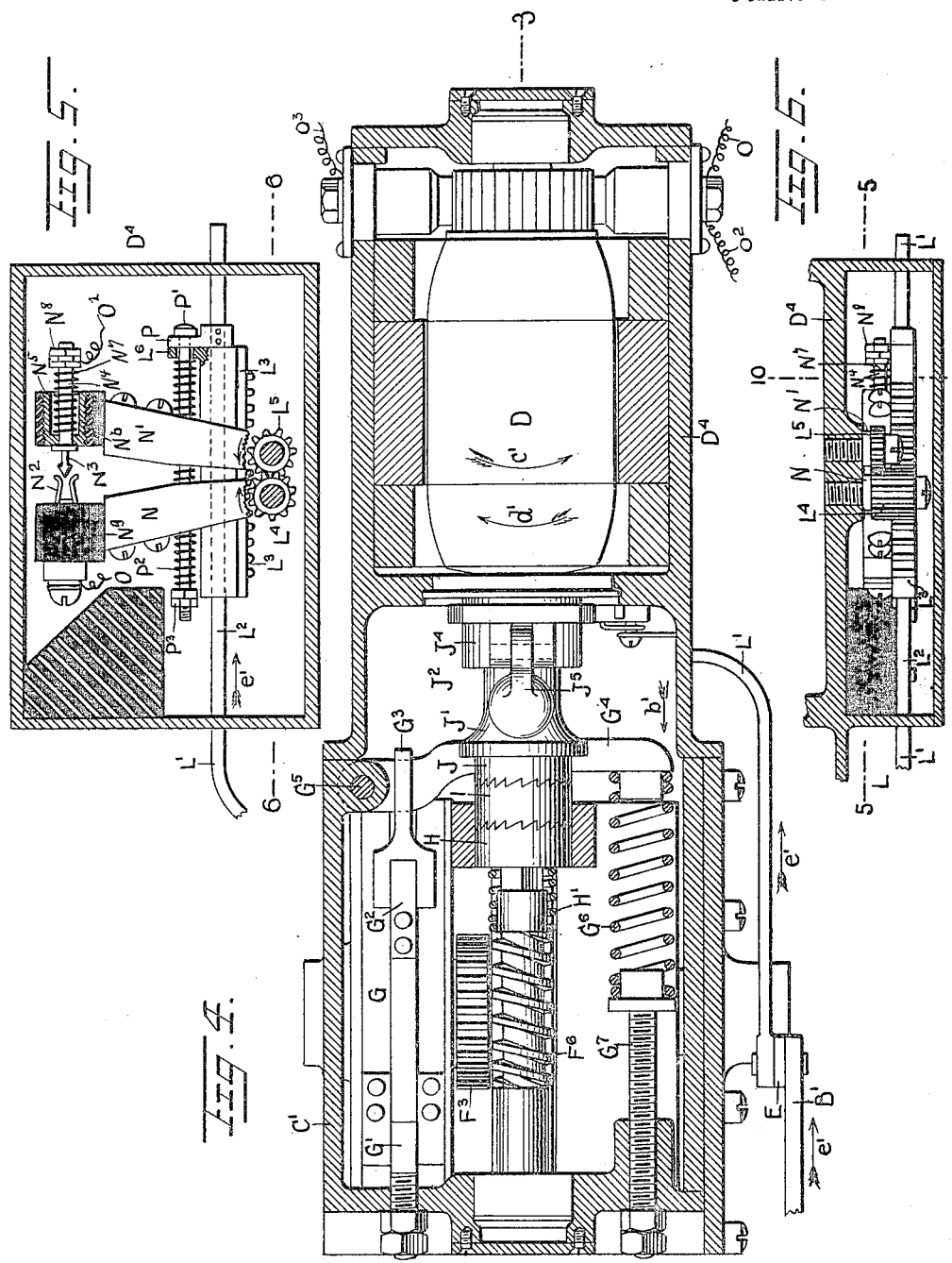

E. A. DIETERICH.
BRAKE MECHANISM.
APPLICATION FILED MAR. 24, 1915.

1,225,595.

Patented May 8, 1917.
5 SHEETS—SHEET 4.

WITNESSES
H. J. Walker

INVENTOR
Edward A. Dieterich
BY
ATTORNEYS

E. A. DIETERICH.
BRAKE MECHANISM.
APPLICATION FILED MAR. 24, 1915.

1,225,595.

Patented May 8, 1917.
5 SHEETS—SHEET 5.

INVENTOR
Edward A. Dieterich

WITNESSES
H. J. Walker
Theo. G. Hoster

BY
ATTORNEYS

UNITED STATES PATENT OFFICE.

EDWARD A. DIETERICH, OF NEW YORK, N. Y.

BRAKE MECHANISM.

1,225,595.  Specification of Letters Patent.  Patented May 8, 1917.

Application filed March 24, 1915. Serial No. 16,736.

*To all whom it may concern:*

Be it known that I, EDWARD A. DIETERICH, a citizen of the United States, and a resident of the city of New York, borough of the Bronx in the county of Bronx and State of New York, have invented a new and Improved Brake Mechanism, of which the following is a full, clear, and exact description.

The object of the invention is to provide a new and improved brake mechanism more especially designed for use on automobiles and other vehicles and devices and arranged to insure a quick and graduated application of the vehicle brake in an exceedingly economical manner and without producing undesirable vibrations.

In order to accomplish the desired result, use is made of a spring motor connected with the vehicle brake for applying the same, and a power-driven motor for winding up the spring of the spring motor for utilizing the power of the spring for the application of the vehicle brake the application being wholly independent of the power-driven motor or the consumption of the motive agent for driving the power driven motor.

A practical embodiment of the invention is represented in the accompanying drawings forming a part of this specification, in which similar characters of reference indicate corresponding parts in all the views.

Fig. 3 is a longitudinal central section of the brake mechanism on the line 3—3 of Fig. 4;

Fig. 4 is a sectional plan view of the same;

Fig. 5 is a sectional plan view of the limit switch, the section being on the line 5—5 of Fig. 6;

Fig. 6 is a sectional side elevation of the same on the line 6—6 of Fig. 5;

Figure 1:
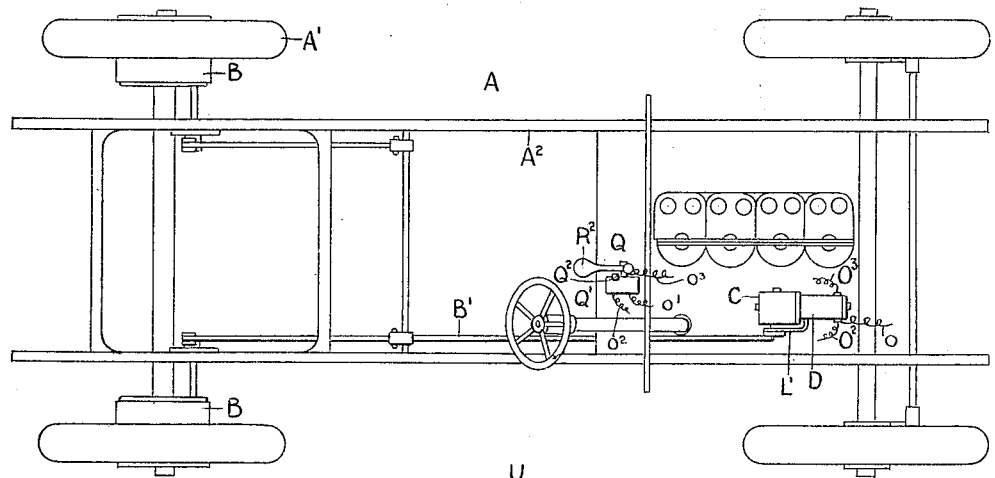
Figure 1 is a plan view of the brake mechanism as applied to an automobile.

The vehicle A shown in outline in Fig. 1 is provided with the usual vehicle brake B connected with the rear wheels A' to brake the same for stopping or slowing up the vehicle whenever it is desired to do so by the chauffeur or driver of the vehicle. The vehicle brake B is controlled by a spring motor C provided with a casing C' attached to the chassis or framework $A^2$ of the vehicle A. The spring motor C is controlled by a power-driven motor D, preferably a reversible electric motor of any approved construction.

Figure 7:
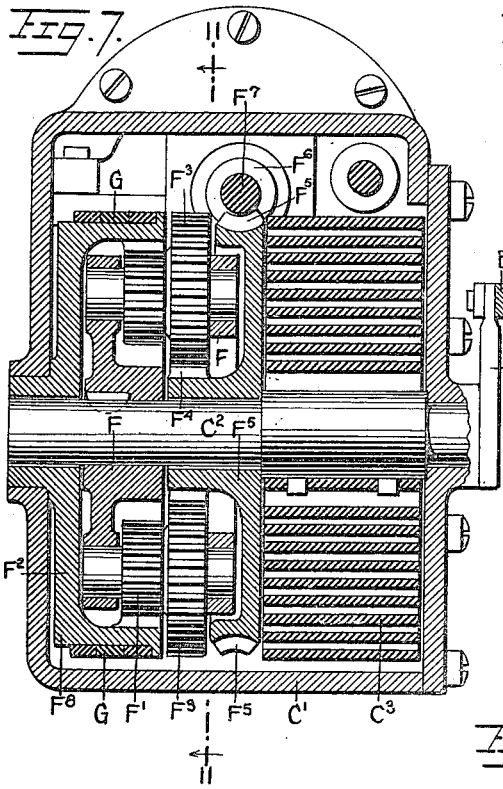
Fig. 7 is a cross section of the spring motor and connections, the section being on the line 7—7 of Fig. 3.
Figure 8:
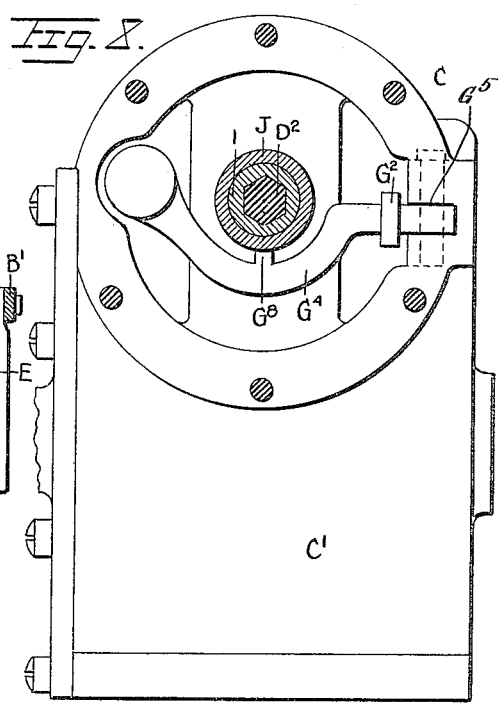
Fig. 8 is a cross section of the clutch mechanism for connecting the power-driven motor with the gearing for the spring motor, the section being on the line 8—8 of Fig. 3.
Figure 10:
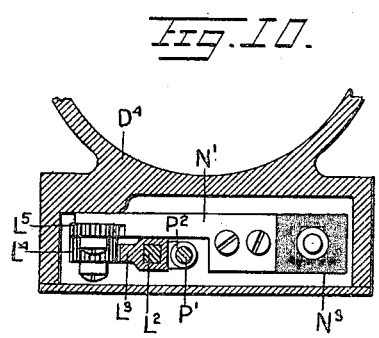
Fig. 10 is a cross section of the limit switch, the section being on the line 10—10 of Fig. 6.

The spring motor C is arranged as follows: In the casing C' is journaled a shaft $C^2$ on which is secured the inner end of a helical spring $C^3$ (see Fig. 7) having its outer end attached to the casing C', as indicated in Fig. 3. One outer end of the shaft $C^2$ is provided with an arm E connected with the brake rod B' of the vehicle brake B so that when the spring $C^3$ unwinds and turns the shaft $C^2$ in the direction of the arrow $a'$ (see Fig. 3) then the arm E pulls on the brake rod B' to apply the vehicle brake B. On the shaft $C^2$ within the casing C' is secured a gear cage F on which are journaled pinions F' in mesh with an integral gear wheel $F^2$ mounted to rotate loosely on the shaft $C^2$ and journaled in the casing C'. The pinions F' are attached to or form part of gear wheels $F^3$ in mesh with a gear wheel $F^4$ formed or secured on the hub of a worm wheel $F^5$ loose on the shaft and in mesh with a worm $F^6$ secured or formed on a worm shaft $F^7$ journaled in suitable bearings arranged on the casing $C'$, as plainly indicated in Fig. 3. The internal gear wheel $F^2$ previously mentioned also forms a brake wheel and for this purpose its rim $F^8$ is engaged by a brake band G secured at one end $G'$ to the casing $C'$ and having its other end $G^2$ connected by a strap $G^3$ with a lever $G^4$ extending transversely and fulcrumed at $G^5$ on the casing $C'$. The free end of the lever $G^4$ is pressed on by one end of a spring $G^6$ abutting at its other end on a screw $G^7$ held adjustable in the casing $C'$ to permit of regulating the tension of the spring $G^6$. When the lever $G^4$ is in normal position it exerts a pull on the brake band G to hold the wheel $F^2$ against turning. In case the spring $C^3$ is wound up and the brake band G is released by the lever $G^4$ swinging rearwardly in the direction of the arrow $b'$ then the spring $C^3$ of the spring motor is released and turns the shaft $C^2$ with a view to apply the vehicle brake B as previously mentioned. When it is desired to wind up the spring $C^3$ the brake band G is drawn tight on the wheel $F^2$ to hold the latter against rotation while rotating the shaft $F^7$ so that the rotary motion of this shaft $F^7$ is transmitted by the worm $F^6$, worm wheel $F^5$, gear wheels $F^4$, $F^3$ and pinions $F'$ to the cage F to turn the latter and with it the shaft $C^2$ to wind up the spring $C^3$. It is understood that the pinions $F'$ are caused to travel around on the internal gear wheel $F^2$ held stationary at the time by the brake band G so that the cage F is caused to travel around to turn the shaft $C^2$ for winding up the spring $C^3$ as above explained. It is also understood that the gearing described is a planetary gearing for driving the shaft $C^2$ from the worm shaft $F^7$, and the planetary gearing permits unwinding of the spring $C^3$ whenever the rim $F^8$ of the wheel $F^2$ is released by the brake band G.

Figure 9:
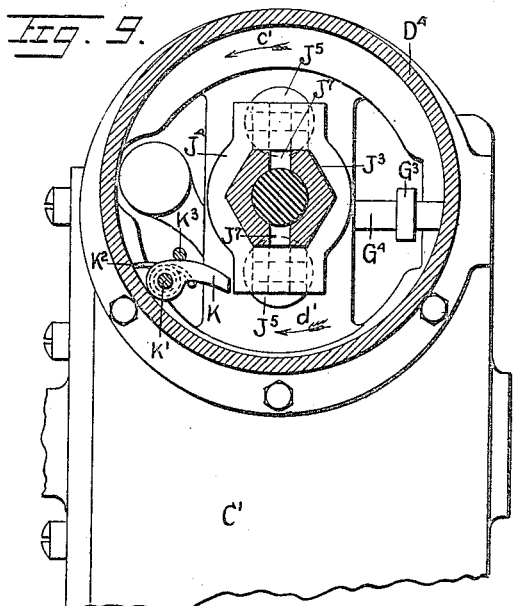
Fig. 9 is a cross section of the governor controlled by the power-driven motor, the section being on the line 9—9 of Fig. 3.
Figure 11:
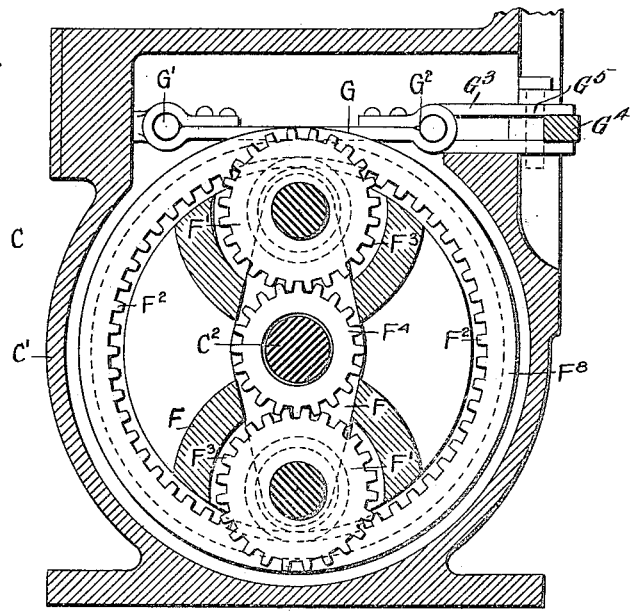
Fig. 11 is a sectional side elevation of the planetary gear and brake for the spring motor, the section being on the line 11—11 of Fig. 7.

The worm wheel shaft $F^7$ is in axial alinement with the shaft $D'$ of the power driven motor D, as plainly shown in Fig. 3, and on a polygonal portion $F^9$ of the worm shaft $F^7$ is mounted to slide and rotate with the shaft $F^7$ a clutch member H pressed on by one end of the spring $H'$ resting with its other end on the adjacent end of the worm $F^6$. The clutch member H is in mesh with a clutch member I mounted to turn with and to slide lengthwise on a polygonal portion $D^2$ formed on the motor shaft $D'$. The clutch member I also engages a clutch member J formed on a sleeve $J'$ mounted to slide loosely on the motor shaft $D'$ forming part of a centrifugal governor $J^2$. The sleeve $J'$ has the front portion $J^3$ made polygonal (see Fig. 9) and on this polygonal portion is mounted loosely a frame $J^4$ normally abutting against a collar $D^3$ on the motor shaft $D'$. On the frame $J^4$ are pivoted weighted arms $J^5$ provided at their fulcrum ends with lugs $J^6$ adapted to pass through slots $J^7$ formed in the polygonal portion $J^3$ of the sleeve $J'$ to engage the front walls of the said slots $J^7$. The rearward end of the sleeve $J'$ engages a pin $G^8$ held on the lever $G^4$ previously mentioned so that when the sleeve $J'$ is moved rearward a swinging motion is given to the lever $G^4$ in the direction of the arrow $b'$ to release the brake band G on the rim $F^8$ of the gear wheel $F^2$, as previously explained. When the motor D is stopped and the arms $J^5$ of the governor $J^2$ return to normal resting position then the spring $G^6$ imparts a return swinging movement to the lever $G^4$ in the inverse direction of the arrow $b'$ to return the sleeve $J'$ and with it its clutch member J. By reference to Fig. 4, it will be noticed that the teeth of the clutch member I in engagement with the clutch member J are arranged reversely from the teeth of the clutch member I engaging the clutch member H. Thus when the motor D is rotated in the direction of the arrow $c'$ the clutch member I carries the clutch member J along and in doing so the weighted arms $J^5$ fly outward and their lugs $J^6$ now push the sleeve $J'$ rearward for imparting a swinging motion to the lever $G^4$, as previously explained. When the motor D is stopped, the arms $J^5$ return to normal inactive position with the weights of the arms $J^5$ resting on the peripheral face of the sleeve $J'$. It is understood that when the motor D runs in the direction of the arrow $c'$ then the teeth of the clutch member I glide over the teeth of the clutch member H and consequently the worm shaft $F^7$ is not rotated. When the motor is rotated in the direction of the arrow $d'$, that is, in the inverse direction of the arrow $c'$ then the clutch member I does not turn the clutch member J but turns the clutch member H and with it the shaft $F^7$ and the worm $F^6$, and the rotary motion of the worm $F^6$ is transmitted to the shaft $C^2$, as previously explained, whereby the spring $C^3$ is wound up, it being understood that during this winding up operation the wheel $F^2$ is held against rotation by the action of the brake band G held tight around the rim $F^8$ by the lever $G^4$ pressed forwardly by its spring $G^6$.

In order to prevent the governor $J^2$ from accidentally rotating at the time the motor D is driven in the reverse direction, that is, in the direction of the arrow $d'$, use is made of a spring-pressed dog K (see Fig. 9) fulcrumed at $K'$ on the motor casing $D^4$ and pressed on by a spring $K^2$ to allow the dog K to swing in one direction by the action of the frame $J^4$ of the governor rotating in the direction of the arrow $c'$. When the shaft D', however, rotates in the direction of the arrow $d'$ then the dog K holds the frame $J^4$ against turning, as will be readily understood by reference to Fig. 9. The swinging movement of the dog K in an upward direction is limited by a stop pin $K^3$ held on the motor casing $D^4$.

In order to automatically cut out the power-driven motor D after the vehicle brake B is fully released use is made of a limit switch L, preferably located in the lower portion of the motor casing $D^4$ and arranged as follows, special reference being had to Figs. 4, 5, 6 and 10: On the arm E is pivoted a forwardly extending rod L' mounted to slide lengthwise in the lower portion of the casing $D^4$. The rod L' is provided within the casing $D^4$ with a polygonal portion $L^2$ (see Fig. 10) on which is mounted to slide a rack $L^3$ in mesh with a pinion $L^4$ journaled in the casing $D^4$. The pinion $L^4$ is in mesh with a pinion $L^5$ and on the pinions $L^4$ and $L^5$ are secured contact arms N and N' provided at their free ends with insulated contacts $N^2$ and $N^3$ connected by wires O and O' with the reverse circuit of the motor D. The contacts $N^2$ and $N^3$ are of the spring snap switch type, that is, the contact $N^2$ is in the form of two spring arms between which is adapted to pass the arrow head of the other contact $N^3$, and the contact $N^3$ is provided with a binding post $N^4$ slidable in a bushing $N^5$ secured in the end $N^6$ of the corresponding arm N' and which end $N^6$ is made of an insulating material. The binding post $N^4$ is pressed on by a spring $N^7$ resting with one end on the bushing $N^5$ and pressing with its other end against a clamping means $N^8$ held on the outer end of the binding post and to which clamping means $N^8$ the wire O' is attached. The other contact $N^2$ is held fixed in the end $N^9$ of the arm N and which end is of an insulating material. When the arms N and N' swing toward each other the contacts $N^2$, $N^3$ move into engagement one with the other, and when the arms N and N' swing from each other the spring $N^7$ is compressed until the tension of the spring overcomes the resilient force of the engaged contacts $N^2$, $N^3$ to quickly pull the latter out of engagement and thus break the reversing circuit of the motor D.

By this arrangement the gap between the contacts $N^2$, $N^3$ is quickly made sufficiently large to prevent arcing across the said contacts.

The front end of the rack $L^3$ abuts against an arm P attached to the rod L' and on the arm P is secured a rod P' extending loosely through a lug $L^6$ held on the rack $L^3$. A spring $P^2$ is coiled on the rod P' and abuts with its rearward end on a nut $P^3$ screwing on the outer end of the rod P'. The other end of the spring $P^2$ presses against the lug $L^6$ so that when the rod L' moves forwardly in the direction of the arrow $e'$ (see Fig. 5) then it carries along the arm P whereby the spring $P^2$ pressing on the lug $L^6$ carries along the rack $L^3$ to rotate the gear wheels $L^4$, $L^5$, with a view to impart a swinging motion to the contact arms N and N' whereby the contacts $N^2$, $N^3$ move in engagement with each other. By arranging the rod P' and spring $P^2$, as described, the rod L' may move farther forward after the contacts $N^2$, $N^3$ are in engagement with each other without danger of injuring or breaking any one of the parts as the spring $P^2$ is merely compressed on further forward movement of the rod L'. It will be noticed that by the arrangement described, very little movement on the part of the rod L is required to move the contacts $N^2$ and $N^3$ into engagement with each other to close the motor circuit. When the brake B is released, the rod L' moves in the inverse direction of the arrow $e'$ and the rack $L^3$ returns and in doing so it causes the arms N and N' to swing apart to move the contacts $N^2$, $N^3$ out of engagement thereby breaking the circuit for the motor D, as above explained.

Figure 2:
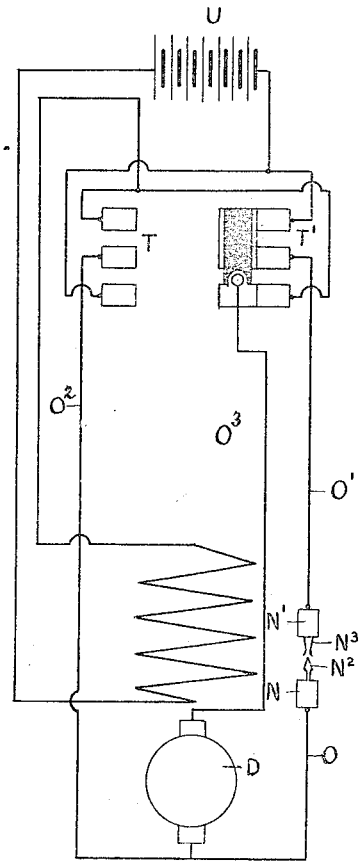
Fig. 2 is a diagrammatic view of the electrical connections.
Figure 12:
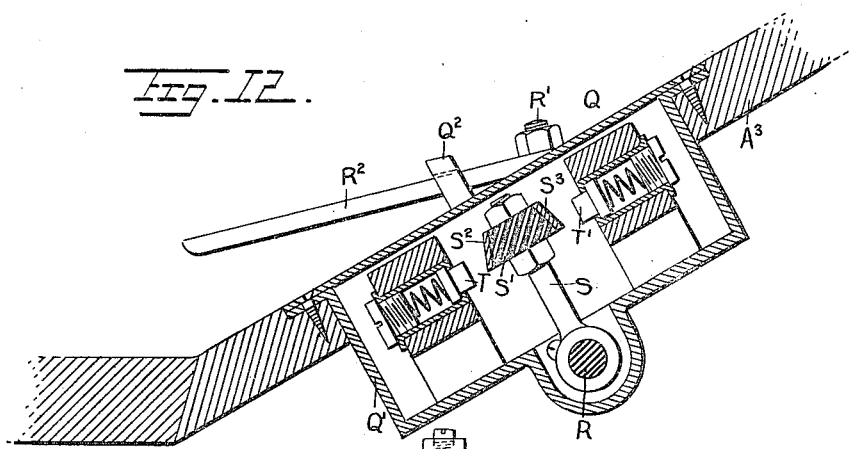
Fig. 12 is an enlarged sectional side elevation of the pedal-controlled switch for the power-driven motor, the section being on the line 12—12 of Fig. 13.
Figure 13:
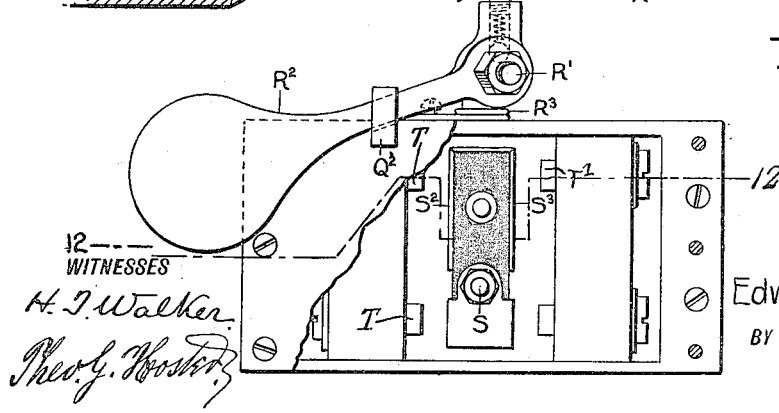
Fig. 13 is a plan view of the same with part of the cover broken out.

The controlling switch Q for the motor D is arranged as follows, special reference being had to Figs. 12 and 13: The casing Q' of the controlling switch Q is attached to the bottom $A^3$ of the chassis $A^2$ and in the casing Q' is journaled a shaft R on one outer end of which is secured a pin R' on which is mounted to swing sidewise a pedal $R^2$ under the control of the foot of the chauffeur in charge of the vehicle. The spring $R^3$ attached to the casing Q' engages the shaft R to normally hold the pedal $R^2$ in uppermost position. On the top of the casing Q' is secured a keeper $Q^2$ adapted to be engaged by the pedal $R^2$ when the latter is swung sidewise toward the casing Q' to hold the pedal $R^2$ against swinging in an up or down direction. On the shaft R within the casing Q' is secured a post S provided with a block S' of hard rubber or other insulating material, and this block is provided with oppositely disposed contact plates $S^2$, $S^3$ adapted to make contact with spring-pressed contacts T and T' connected with the circuit wires O' and $O^2$ for the motor, the shaft R being connected with the return circuit wire $O^3$ also of the circuit for the motor, as plainly indicated in Fig. 2. When the pedal $R^2$ is in normal position, that is, out of engagement with the keeper $Q^2$ and in uppermost position by the action of the spring $R^3$ then the contact $S^3$ is in engagement with the contacts T' to close the circuit for the motor D with a view to run the latter in the direction of the arrow $d'$. When it is desired to reverse the motor, pedal $R^2$ is pressed downward to impart a rocking motion to the shaft R with a view to move the contact S³ out of engagement with the contact T' and to move the contact S² into engagement with the contact T to reverse the motor, that is, to run the same in the direction of the arrow c'. It is understood that the pole-changing switch described may be of any approved construction and I do not limit myself to the one shown and described. It is understood that when the pedal R² is pressed half way downward and swung sidewise into engagement with the keeper Q² then the contacts S², S³ are in intermediate position, that is, out of engagement with the pole contacts T and T' so that the circuit is broken and the motor D cannot be started. This arrangement is especially serviceable when the chauffeur leaves the car so as to prevent the motor from starting, or releasing the vehicle brake or rewinding the spring. It is understood that the contacts T and T' are connected with a suitable source of electrical energy, as indicated in Fig. 2, to supply the motor D with electrical energy.

The operation is as follows:

Normally the power-driven motor D is at rest and the spring C³ of the spring motor C is held against unwinding by the brake band G being drawn tight around the rim F⁸ by the action of the spring-pressed lever G⁴. When it is desired to apply the vehicle brake B then the operator presses the pedal R² to move the contacts S² and T in engagement with each other thus closing the circuit for the power-driven motor D to rotate the latter in the direction of the arrow c'. The rotary motion of the shaft D' of the power-driven motor D is transmitted by the clutch member I to the clutch member J of the governor J² to rotate the latter and thus cause the weighted arms J⁵ to swing outward by centrifugal force. When this takes place the lugs J⁶ engage the sleeve J' and push the same rearwardly whereby a swinging movement is given to the lever G⁴ in the direction of the arrow b' to release the brake band G and consequently the spring motor C to allow the spring C³ thereof to unwind and in doing so turn the shaft C². The rotary motion of the shaft C² causes the arm E to impart a forward movement to the brake rod B' to apply the vehicle brake B. The swinging movement given to the arm E causes the rod L' to move in the direction of the arrow e' so that the arm P moves the rack L³ in the same direction whereby the arms N and N' are caused to swing toward each other thus moving the contacts N², N³ in engagement with each other to close the circuit for the limit switch L. It is understood that a further turning of the shaft C² allows the rod L' to move farther forwardly in the direction of the arrow e' without affecting the contacts N², N³ owing to the spring connection between the rod L² and the rack L³, as above explained. From the foregoing it will be noticed that the power-driven motor D is used to release the wound-up spring C³ for the latter to apply the brake by its power and wholly irrespective of the power-driven motor D. When the power-driven motor D is stopped by the operator returning the pedal R² to neutral position, the governor arms J⁵ swing back to their position of rest and the sleeve J' is now pushed forward by the action of the spring-pressed lever G⁴ which also draws the brake band G tight around the rim F⁸ of the wheel F², thus allowing the spring C³ to hold the vehicle brake applied until released. When it is desired to release the vehicle brake B then the operator allows the pedal R² to swing into an upward direction to connect the contacts S³ and T' with each other to close the circuit for rotating the power-driven motor D in a reverse direction, that is, in the direction of the arrow d'.

When this takes place, the rotary motion of the shaft D' is transmitted by the clutch member I to the clutch member H to rotate the worm shaft F⁷. The rotary motion of this worm shaft F⁷ is transmitted by the planetary gearing to the shaft C² to wind up the spring C³, it being understood that the wheel F² is held against rotation by the brake band G drawn tight around the rim F⁸ of the said wheel F², as above explained. A return movement of the shaft C² causes a rearward swinging of the arm E whereby the rod L' is moved rearward in the inverse direction of the arrow e' and consequently the rack L³ is moved in the same direction to cause the arms N and N' to swing from each other so that the contacts N² and N³ move quickly out of engagement to suddenly break the circuit for the power-driven motor D at the limit switch L.

From the foregoing it will be seen that by the arrangement described the vehicle brake B can be quickly applied on rotating the power-driven motor D in the direction of the arrow c' and the vehicle brake can be quickly released and the spring C³ rewound on rotating the power-driven motor D in the reverse direction, that is, in the direction of the arrow d'. After the brakes have been applied and it is necessary for the operator to leave his seat in the vehicle then the operator, prior to doing so, swings the pedal R² into locked position in the keeper Q² to prevent the power-driven motor D from being rotated in either the direction c' or in the reverse direction.

By applying the vehicle brake with the power of the spring C³ and without flexible connections and wholly independent of the power of the motor D, it is evident that vibrations are reduced to a minimum.

By providing both a limit switch L and a foot-controlled controlling switch Q the operator does not need to release the steering wheel at any time, and when the pedal R² is released the circuit is automatically broken as soon as the vehicle brake B is fully released through the action of the limit switch L. By this arrangement the car brake is always in released position when the controlling pedal R² is in released position.

Although I prefer to release the spring motor in the manner set forth, it is evident that any other manual or power means may be used for releasing the spring motor whenever it is desired to do so.

It is also to be distinctly understood that the limit switch L can be dispensed with and the controlling switch Q so arranged that the braking device for the spring motor can be operated by hand or foot.

In practice, the shaft C² of the spring motor oscillates but a short distance (about one quarter) revolution when applying the vehicle brake B, and a like return oscillation is given to the said shaft for rewinding the spring C³, which latter is always under more or less tension.

It will be noticed that by this arrangement the operator by correspondingly actuating the pedal R² can quickly apply and release the vehicle brake B.

Having thus described my invention, I claim as new and desire to secure by Letters Patent:

1. In combination, a spring motor, a reversible power-driven motor connected with the said spring motor for winding up the spring thereof, a brake for the spring motor, and releasing means for releasing the brake of the spring motor, the said releasing means being operated by reversing the said power-driven motor.

2. In combination, a spring motor, a brake for the said spring motor, a reversible power-driven motor mechanism connecting the power-driven motor with the said spring motor for winding up the spring motor, and means for connecting the power driven motor with the said brake for the spring motor for releasing the latter on reversing the power-driven motor.

3. In combination, a spring motor, a spring motor brake for the said spring motor and provided with a spring-pressed lever for normally holding the said spring motor brake applied to stop the spring motor, a power-driven motor, a governor means for controlling the governor from the said power-driven motor and means actuated by the governor for controlling the said lever.

4. In combination, a spring motor, a reversible power-driven motor, a gearing connected with the said spring motor, a clutch mechanism for connecting the said power-driven motor with the said gearing when the driven motor is running in one direction, to wind up the spring of the spring motor, a spring motor brake for the said gearing, and a governor connected by the said clutch mechanism with the said power-driven motor when the latter is running in the other direction, the said governor controlling the said spring motor brake.

5. In combination, a spring motor, a brake for the spring motor, a reversible power-driven motor, mechanism for connecting the power-driven motor with the said brake and controlled by the said power-driven motor, when running in one direction, for releasing the brake of said spring motor, and mechanism for connecting the power-driven motor with the spring motor, and controlled by the said power-driven motor when running in a reverse direction, for winding up the spring of the said spring motor.

6. In combination, a spring motor, a brake for the spring motor, a reversible power-driven motor, mechanism controlled by the said power-driven motor when running in one direction, for releasing the brake of said spring motor, mechanism controlled by the said power-driven motor when running in a reverse direction, for winding up the spring of the said spring motor, and a limit means controlled by the said spring motor for stopping the power-driven motor.

7. In combination, a spring motor, a brake mechanism for the spring motor, a reversible power-driven motor mechanism controlled by the said power-driven motor when running in one direction for releasing the brake mechanism of the spring motor, mechanism controlled by the said power-driven motor when running in a reverse direction for winding up the spring of the said spring motor, and a manually controlled controlling device for the said reversible power-driven motor to stop and start the power in either direction.

8. In combination, a spring motor, an internal gear wheel mounted loosely on the shaft of the spring motor and forming a brake wheel, a brake for preventing the said brake wheel from turning, gearing for winding up the spring motor at the time the brake is applied, the said gearing including pinions in mesh with the said internal gear wheel and traveling around the same when the gearing is actuated to wind up the spring, and means for releasing the said brake, to allow the spring motor to exert its power.

9. In combination, a spring motor, an internal gear wheel mounted loosely on the shaft of the spring motor and forming a brake wheel, a brake band for preventing rotation of said brake wheel, gearing for winding up the said spring motor at the time the brake band is applied to the brake wheel, a power driven motor for actuating the gearing, the said gearing including pinions in mesh with the internal gear wheel and traveling around the same when the gearing is actuated to wind up the spring of the motor, and means for releasing the said brake band to allow the spring motor to exert its power independent of the said power driven motor.

10. In combination, a spring motor, a gearing for winding up the said spring motor and provided with a brake mechanism, an electric motor for driving the said gearing, a governor, and a clutch mechanism having one driven clutch member driven by the said electric motor and two clutch members controlled by the said driven member and connected respectively with the said gearing and the said governor.

11. In combination, a spring motor, a gearing for winding up the said spring motor and provided with a brake mechanism, an electric motor for driving the said gearing, the brake mechanism being provided with a spring-pressed lever, a governor controlling the said lever, and a clutch mechanism controlled by the said electric motor on reversing the latter for actuating the said governor to cause the said lever to release the said brake mechanism.

12. In combination, a spring motor, a gearing for winding up the said spring motor, a brake mechanism for the said gearing and having a spring-pressed lever, a reversible electric motor, a governor controlling the said lever, and a clutch mechanism controlled from the said electric motor and adapted to connect the latter with the said gearing and the said electric motor with the said governor.

13. In combination, a spring motor, a gearing for winding up the said spring motor, a brake mechanism for the said gearing and having a spring-pressed lever, a reversible electric motor, a governor controlling the said lever, a clutch mechanism controlled from the said electric motor and adapted to connect the latter with the said gearing and the said electric motor with the said governor, and a limit switch for the circuit of the said electric motor and controlled by the said spring motor.

14. In combination, a spring motor, a gearing for winding up the said spring motor, a brake mechanism for the said gearing and having a spring-pressed lever, a reversible electric motor, a governor controlling the said lever, a clutch mechanism controlled from the said electric motor and adapted to connect the latter with the said gearing and the said electric motor with the said governor, and a controlling switch for the circuit of the said electric motor, the said controlling switch having a pedal and a retaining device for the pedal to hold the latter in neutral position.

In testimony whereof I have signed my name to this specification in the presence of two subscribing witnesses.

EDWARD A. DIETERICH.

Witnesses:
WALTER L. WILSON,
PATRICK F. FOLEY.

Copies of this patent may be obtained for five cents each, by addressing the "Commissioner of Patents, Washington, D. C."